United States Patent [19]

Salter

[11] Patent Number: 4,974,989
[45] Date of Patent: Dec. 4, 1990

[54] METHOD FOR REDUCING INSTALLATION FORCES AND COSTS IN A TAPERED BOLT INSTALLATION

[76] Inventor: Larry Salter, 30154 Rhone Dr., Rancho Palos Verdes, Calif. 90274

[21] Appl. No.: 525,294

[22] Filed: Aug. 22, 1983

[51] Int. Cl.⁵ .............................................. B23P 19/04
[52] U.S. Cl. ................................. 403/408.1; 403/312; 403/334; 403/337; 403/388; 411/339; 411/81; 29/525; 29/526 R
[58] Field of Search .................... 403/408.1, 388, 312, 403/337, 334; 411/339, 399, 57, 81; 29/525, 526 R

[56] References Cited

U.S. PATENT DOCUMENTS

| | | | |
|---|---|---|---|
| 3,034,611 | 5/1962 | Zenic | 403/408 |
| 3,176,808 | 4/1965 | Matthews | 411/378 X |
| 3,270,410 | 9/1966 | Salter et al. | 411/378 X |
| 3,271,058 | 9/1966 | Anderson | 403/408 |
| 3,304,109 | 2/1967 | Schuster | 29/525 |
| 3,603,626 | 9/1971 | Whiteside | 403/408 |
| 4,048,898 | 9/1977 | Salter | 411/44 |
| 4,087,896 | 5/1978 | Salter | 29/525 X |
| 4,102,036 | 7/1978 | Salter | 29/525 |

Primary Examiner—Randolph A. Reese
Assistant Examiner—Franco Deliguori

[57] ABSTRACT

A stacked array comprising at least one or more similar or dissimilar metals or composites and having either a tapered bore or a tapered sleeve. A tapered bolt adapted to be inserted into the tapered bore and having a taper that is different from the tapered bore. A method for selecting a greater or lesser taper on the bolt than the taper on the bore depending on the relative strength of the materials forming the stacked array as a means of reducing the installation force of the tapered bolt within the tapered bore.

10 Claims, 2 Drawing Sheets

METHOD FOR REDUCING INSTALLATION FORCES AND COSTS IN A TAPERED BOLT INSTALLATION

This invention relates to an apparatus and method for reducing the installation forces of a tapered bolt in a stacked array of similar or dissimilar metals or composites having a tapered bore and a tapered bolt and more particularly to devices known generally as a sleevebolt fastening system and a taperbolt fastening system for attaching relatively thin sheets of similar or dissimilar metals or non-metals together.

In the prior art the concept of utilizing a tapered bore and a tapered bolt to prestress a fastening in a stacked array of materials is well known and is exemplified in the Salter Patent 3,270,410 issued Sep. 6, 1966. This prior Salter patent is generally known as the taperbolt patent and discloses techniques for utilizing a tapered bore in a stacked array of dissimilar metals that is operated on by a bolt having the same taper as the tapered bore in the stacked array. The patent describes a device and method for prestressing the tapered bore to achieve a more uniform and precise attachment of the materials.

The techniques disclosed in the Salter patent are well known and in use today for obtaining an interference fit between a tapered bolt and a tapered bore and in which the tapered bolt has the same taper as the bore.

Certain improvements have been made in the fastening art as exemplified by Salter Patent 4,048,898. In this Salter patent installation of the fastening device to the stacked array was simplified by producing a sleeve having an external fixed diameter and an internal taper designed to meet the taper of a bolt inserted into the tapered sleeve. The installation in the field was simplified by requiring only that a hole having a given diameter be drilled in the stacked array and that the complete assembly of sleeve and bolt be inserted into the stacked array with the tapered bolt inserted to provide the prestressing of the tapered bore through expansion of the sleeve as the bolt is fastened to its final position. Installation was made more precise since the sleeve and the bolt could be precision machined under production tolerances in a machine shop while the final installing of the complete assembly into the stacked array required only that a straight hole be drilled in the field. This concept eliminated the need of drilling a tapered bore in the field which admittedly was expensive, difficult, time-consuming, and at best counter-productive. This Salter patent is also finding wide use in the by the mechanic field and is generally known as the sleevebolt patent.

There are of course many other fastening devices using a tapered bore and a tapered bolt and they include the Campbell Patent 2,525,117, the Zenzic Patent 3,034,611, and the Anderson Patent 3,271,058, just to name a few. In all these prior art patents utilizing a tapered bore and a tapered bolt, the concept was always to use a constant taper in order to determine a given interference which would be constant throughout the length of the bolt from the largest diameter to the smallest diameter. In other words, all prior art devices utilized a tapered bore cooperating with a tapered bolt and in which the tapered bolt had the same taper as the taper bore. The concept of utilizing a given rate of taper, measured in inches without regard to diameter will result in a given interference between the tapered bore and the tapered bolt without regard to material springback.

Installation of the tapered bolt requires an installation force that must overcome the interference between the whole shank of the tapered bolt and the complete surface of the tapered hole which are in direct contact. For a given diameter bolt the installation force is governed and limited by the fastening method used such as the threads on the lowermost portion of the bolt. The limiting factor is determined by the diameter of the bolt being used. This of course limits the interference between the tapered bolt and the tapered bore to a minimum value of say 0.001 thousandths interference which is a nominal figure when the interference of perhaps 0.008 to 0.010 inch should be used. In other words, depending on the diameter in an inches per inch per diameter bore, the excessive installation force prevents distribution of various amounts of interference at specified points and hence compromises the fastener used for the multi metal stackups.

In the present invention the installation force for a stacked array using a tapered bore and a tapered bolt is reduced regardless of whether the sleevebolt system or taperlock system is used.

In the preferred embodiment the installation force is reduced by utilizing a taper on the bolt that is different from the taper in the bore of the stacked array. Since contact between the tapered bolt and the tapered bore will take place only on a given diameter and not along the complete surface of the bore, the installation forces will be less and it will be possible therefore to achieve a higher interference fit and bearing contact approaching 100% on installation between the tapered bolt and the tapered bore and without the higher installation forces needed as mentioned in the prior art patents.

The benefits claimed for the present invention are achieved by applying an incremental expansive force to the tapered bore which requires less installation force than when attempting to apply an expansive force along the whole shank of the bolt in bearing with the tapered bore.

In the practice of the method described in the present invention, there is provided a tapered bore through layer or layers of material to be fastened. In the preferred embodiment the layers usually are a multi-stacked array of dissimilar metals such as aluminum and titanium and non-metals such as composites. An incremental force is applied to the layers of material throughout substantially the entire depth of the bore until permanent deformation of the tapered bore has taken place. In this new invention deformation is achieved by utilizing a tapered bolt having a taper that is different than the tapered bore in the stacked array. In the practice of the new invention the taper will generally be greater than or less than the taper of the tapered bore in the stacked array.

A tapered bolt or pin having a taper greater than the tapered bore is selected whenever it is desired to increase the expansion of the largest diameter of the tapered bore in the stacked array.

A tapered bolt or pin having a taper that is less than the taper of the tapered bore is selected whenever it is desired to increase the expansion of the smallest diameter of the tapered bore in the stacked array.

The tapered bolt or pin is inserted into the tapered bore to thereby provide an interference fit between the bolt and the bore so as to selectively prestress the layers of material along the desired point of the hole comprising the stacked array. Also this difference in taper may be applied to achieve a very high degree of bearing through the entire length of the bore thereby eliminating costly hole preparation time.

Further objects and advantages of the present invention will be made more apparent by referring now to the accompanying drawings wherein:

FIG. 1 is a vertical sectional view of two dissimilar materials to be fastened and showing a tapered bore formed there through;

Figure 1:
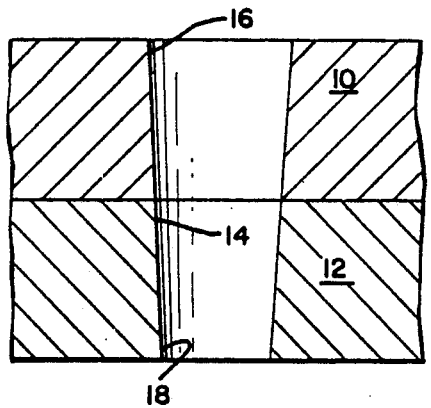

In the field of fastening multiple sheets of metal in fatigue critical aircraft structures, the industry typically uses fasteners of the type described as taperbolt fasteners or sleevebolt fasteners as previously described in connection with Salter Patents 3,270,410 and 4,048,898.

The taperbolt fastener utilizes a tapered bore in the stacked array comprising multiple sheets of materials together with a tapered bolt having the same taper as the tapered bore. In the sleevebolt installation a straight bore is drilled in the stacked array of multiple sheets of materials and a combined sleevebolt having an outside dimension that is cylindrically straight and an internal dimension that is tapered in combination with a tapered pin is used wherein the combination is inserted into the straight hole and then assembled.

Both of the defined methods have found wide applicability in the fastening field and both rely on the fact that an interference fit is determined between the tapered pin and the accepting tapered hole whether it be a sleeve or a tapered bore. The term "interference" has been chosen to mean that the sleeve or bore has been expanded to an outside diameter greater than the initial diameter of the bore or hole, thereby forcing the hole laterally outwardly in an effort to anchor the bolt within the hole. The term "interference fit" naturally applies to bolts, nuts and other assemblies where a comparable action takes place.

The forces required to install the tapered bolt, whether it be in the tapered bore or the tapered sleeve, is a function of the inches per inch diameter interference existing between the tapered bolt and the tapered bore or sleeve.

The installation force required to overcome the friction between the tapered bolt and the bore in view of the interference fit required is limited by the diameter of the bolt and the clamping means located on the bottom portion of the bolt which are operated upon by the clamping device drawing the bolt into the seating position.

The metals usually used in the stackup of an aircraft structure usually comprise titanium and aluminum as well as composites of varying thicknesses and the varying interference required to develop the necessary radial forces to achieve the prestressed condition to establish a proper fastening of the materials is sometimes not available because of the high installation forces incurred thereby resulting in a less than satisfactory prestressed condition of bolt, pin, rivet and fastener.

Simply increasing the interference to develop the prestressed condition will not solve the problem since the clamping means on the fastener will simply fail during installation in view of the excess force needed. This problem has been diagnosed as the reason for the fatigue failure of many apparently satisfactory prestressed fasteners when it has been determined upon analysis that the proper radial stresses to properly prestress the fastener have not been generated or distributed properly and as a result fatigue or stress corrosion failure of the joint has resulted in what otherwise appeared to be a proper connection.

The present invention is concerned primarily with reducing the installation force in either a sleevebolt or taperbolt fastener and achieving a higher degree of bearing between fastener and hole during hole preparation, thereby resulting in less installation time.

Referring now to FIG. 1, there is shown two overlying sheets or plates of material to be fastened together that are generally designated as 10 and 12. A tapered bore 14 is formed through sheets 10 and 12 with one end 16 of the tapered bore 14 having a larger diameter than the other end 18. The taper of bore 14 is even from end 16 to end 18.

Figure 2:
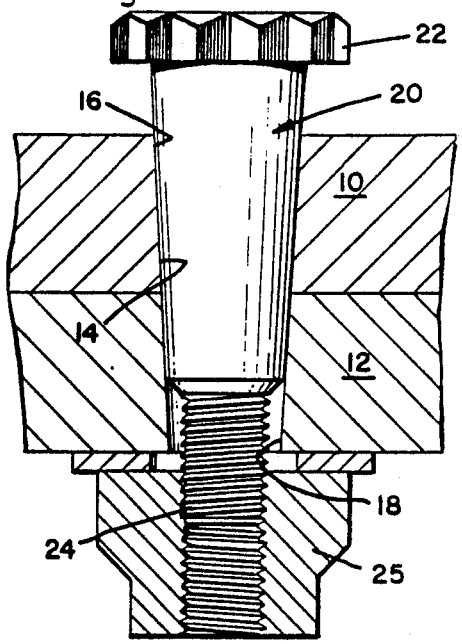
FIG. 2 shows a tapered bolt partially inserted in the tapered bore of FIG. 1.

Referring now to FIG. 2, there is shown an evenly tapered bolt 20 having a head 22 at one end and a threaded portion 24 at the other end inserted within the taper of 14 located within sheets 10 and 12. The taper of the bolt 20 is the same as the taper 14 of the bore. Final assembly of the bolt 20 within the bore 14 is usually accomplished by a nut 25 placed over the threads 14 which generates an installation force necessary to draw the bolt within the hole to its final nesting position.

In the usual case the taper of the bolt and the bore is expressed in terms of say two thousandths of an inch nominal for all diameters, meaning that an interference of two thousandths of an inch will exist for every diameter.

A review of the geometry illustrated in FIG. 1 will show that the radial stress generated at the larger end 16 on sheet 10 will be less than the stress generated at the smaller end 18 on sheet 12. In other words, analysis shows that the interference in terms of inches per inch of diameter or the stress in terms of pounds per inch generated at the big diameter will generate less pounds per inch stress than is generated at the small diameter whenever a uniform interference in terms of inches per inch per diameter is used. Simply stated, generating a given force over a large area reduces the stress per square inch.

The stress generated at the large diameter 16 may or may not be sufficient to prestress the material and provide a good joint and this unknown quantity has been determined to be the reason for the failure rate of certain high stress fastener joints.

The obvious solution to such a problem is to increase the interference from say two to possibly four or even five thousandths per inch and in this way generate the necessary stress at the larger diameter to provide the proper prestressing of the joint.

Unfortunately the total diameter of the bolt and the threads on the lowermost portion such as 24 on bolt 20 will limit the total amount of force that is available to install the bolt.

The brute force solution to this problem has required the use of bolts having a higher strength than is necessary to provide the required fastening capabilities in order to generate the higher installation forces required. The use of these higher strength bolts than is required is obviously a disadvantage in the refastening of aircraft equipment considering the high cost of the fastener and the total number of fasteners used in an aircraft.

Figure 3:
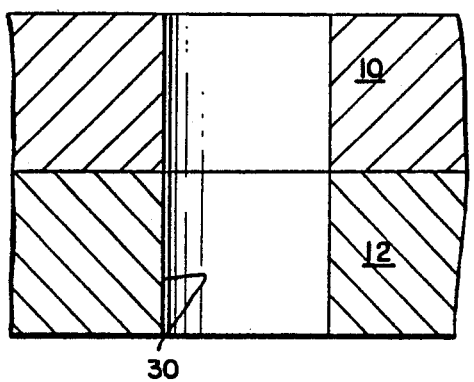
FIG. 3 shows a straight bore formed through the dissimilar sheets to be fastened.
Figure 4:
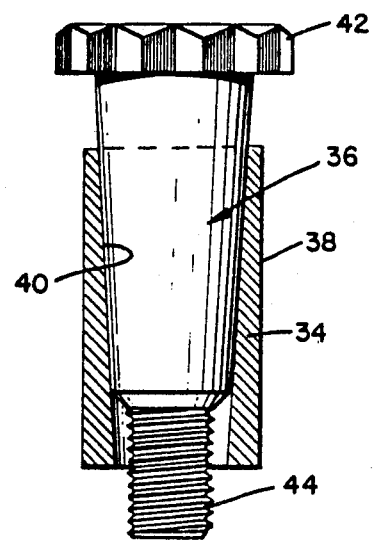
FIG. 4 illustrates a combined tapered sleeve and tapered bolt combination partially inserted in the straight bore of FIG. 3.
Figure 5:
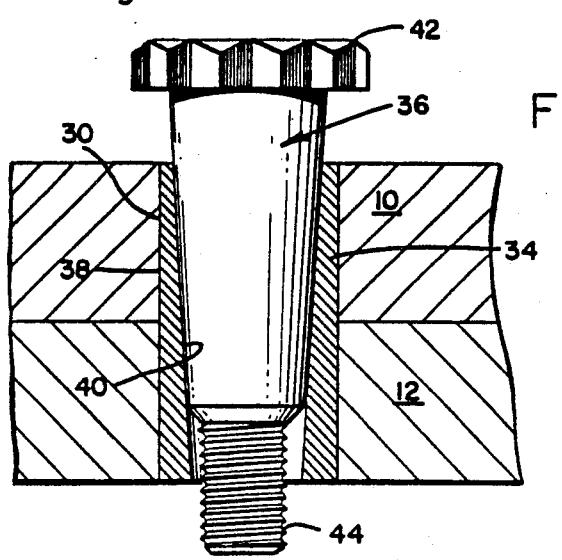
FIG. 5 illustrates the combined sleevebolt inserted in the straight bore of FIG. 3.

The same problem exists in a sleevebolt fastener which is illustrated in FIGS. 3, 4 and 5.

Referring now to FIG. 3, there is shown sheets 10 and 12 in a stacked array, only this time there is included a straight bore 30 which is defined as one having no taper. In other words, the diameter at the upper end is the same as the diameter at the lower end.

Referring now to FIG. 4, there is shown a combined sleeve 34 and bolt 36 and in which the outside diameter 38 of the sleeve is constant whereas the internal diameter of the sleeve 40 is tapered. In the usual situation the taper of the bolt 36 and the internal taper of the sleeve 40 are the same. The bolt has a head 42 at one end and threads 44 at the other end for installation purposes.

Referring now to FIG. 5, there is shown how the combined sleeve 34 and bolt 36 are inserted into the bore 30. An installation nut is threaded on the threaded portion 44 of the bolt 36 and inserted to properly draw the bolt 36 into position. The installation forces generated are a result of the nut bearing against the threads 44 on the bolt 36 thereby drawing the bolt into the sleeve 34.

The stresses generated are a result of the interference existing between the taper on the bolt 36 and the internal taper on the sleeve 34.

Unfortunately the same problem exists in installing the tapered sleeve as described in connection with the taperlock system of FIGS. 1 and 2.

The stress generated at the larger diameter of the bolt will always be less than the stress generated at the smaller diameter for any installation having a constant interference measured in terms of inches per inch diameter. The prior art systems have no solution to this problem other than to use the aforementioned brute force system which means utilizing higher strength fastener devices than are needed to do the fastening job in view of the requirement of producing high stresses at the larger diameter of the bolt to properly prestress the bore and prevent fatigue failure.

The present invention solves these prior art problems by increasing the stress in selected portions of the fastener where higher stresses are needed and at the same time reducing the installation forces and time necessary to accomplish and generate the stresses and bearing required, respectively.

In the present invention the taper on the installation bolt is purposely made different than the taper on the bore of the stacked materials.

Figure 6:
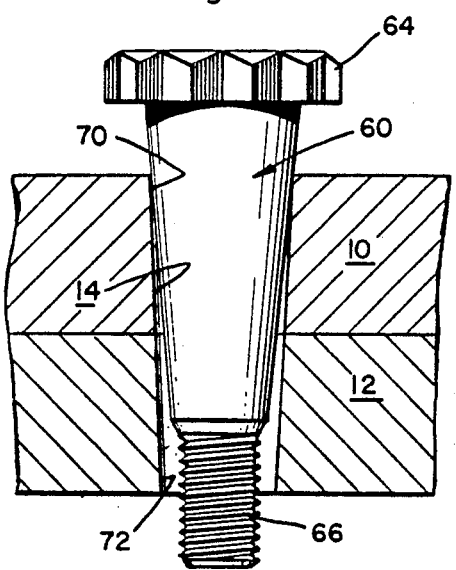
FIG. 6 illustrates a tapered bolt having a taper that is greater than the tapered bore.
Figure 7:
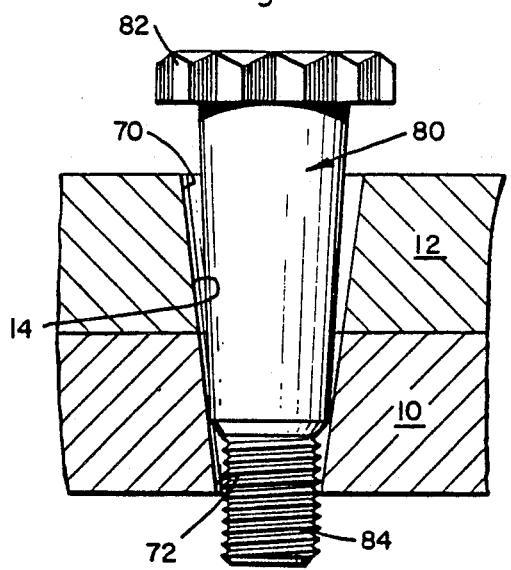
FIG. 7 illustrates a tapered bolt having a taper that is less than the tapered bore.
Figure 8:
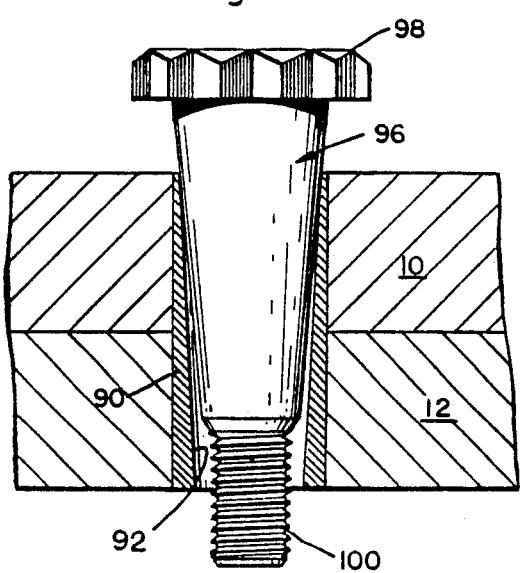
FIG. 8 illustrates a combined tapered bolt and tapered sleeve in which the taper of the bolt is greater than the taper of the sleeve.
Figure 9:
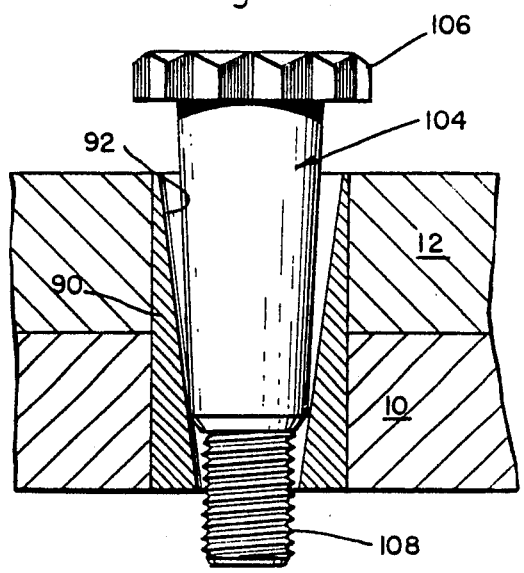
FIG. 9 illustrates a combined tapered bolt and tapered sleeve and in which the taper of the bolt is less than the taper of the sleeve.

FIGS. 6 and 7 will describe the invention in combination with what has been called a taperlock installation whereas FIGS. 8 and 9 will describe the invention in combination with a sleevebolt installation.

Referring now to FIG. 6, there is shown a stacked array of sheets 10 and 12 having a tapered bore 14. Located within the tapered bore is a bolt 60 having a taper that is greater than the tapered bore 14. The bolt is conventional in all other respects and contains a head 64 at one end and threads 66 for use with an installation bolt at the other end.

The larger diameter of the tapered bore is located at 70 in sheet 10 whereas the smaller diameter portion of the tapered bore 72 is located in sheet 12 at the opposite end.

The tapered bolt 60 having a taper greater than the tapered bore 14 will contact the bigger diameter 70 in sheet 10 before contacting any other portion of the hole and hence the larger diameter opening of the tapered bore 16 will experience compressive forces and stress before any other portion of the tapered bore.

The contacting of the tapered bolt with the tapered bore will therefore continue incrementally as the installation nut is tightened, thereby resulting in a reduced installation force as a result of the incremental contacting of the tapered bolt with the tapered bore rather than having the complete surface of the tapered bolt contacting the tapered bore as would generally occur in the conventional installation as illustrated in FIGS. 1 and 2.

As a result of utilizing a tapered bolt having a taper greater than the tapered bore, it is now possible to increase the stress at the larger diameter portion of the tapered bore while at the same time reducing the installation forces necessary to reduce the radial compressive forces necessary to achieve a proper joint, such as a countersink fastener not shown but a common standard in industry.

As an alternative, it is now possible to increase the interference between the fastener and the tapered hole and in this way increase the stress at the larger diameter of the tapered bore while generating the same installation forces generated for the prior art devices. It should be remembered at all times that the tensile forces at the threads or clamping means of the installation bolt is the limiting factor in generating the force needed between the bolt and the tapered bore.

A review of the use of the taperlock and the sleevebolt is in order since it will be appreciated by those skilled in the art that the typical metals presently being used in the aircraft industry are titanium and aluminum and that invariably the fasteners are being used to fasten two dissimilar metals, one having a higher ultimate stress than the other. In all cases the installer knows whether the stronger metal is on top or on the bottom and hence an additional feature is now available to the installer by giving him a selection of tapered bolts having a taper that is greater than or less than the tapered bore.

For example, in FIG. 6 we can assume that sheet 10 is aluminum and that sheet 12 is titanium and it is well known that the titanium sheet can stand a stress on the order of 100,000 pounds per inch while the aluminum sheet 10 would be on the order of 50,000 pounds per square inch.

In this case the installer, knowing that titanium sheet 12 is on the bottom and that the aluminum sheet 10 is on top, would use a tapered bolt 60 having a taper that is greater than the tapered bore 16. The larger diameter of the bolt would contact the larger diameter 70 of the bore and under the urging of the installation nut the forces generated would be incremental as the surface of the bolt contacted more and more of the surface of the tapered bore. In addition, it will be observed that it is the aluminum at the larger diameter portion that is being compressed first and before the area of the titanium sheet 12 is contacted. In this fashion the larger diameter of the bore is expanded incrementally and, further, the metal having the lower strength is expanded before the metal having the higher strength, further reducing the installation forces required.

Referring now to FIG. 7, there is shown a stacked array of sheets 10 and 12 and in which the titanium sheet 12 is located on top of the aluminum sheet 10. The stacked array of FIG. 7 contains a tapered bore 14 and a bolt 80 having a head 82 and a threaded portion at the other end 84 is inserted into the tapered bore 14. In this case bolt 80 has a taper that is less than the tapered bore 14 located in the stacked array.

The mechanic, knowing that the titanium sheet 12 is located on top, will therefore use a bolt having a taper that is less than the taper in the stacked array in order to ensure contact between the bolt, and the smallest diameter is made first at point 72. Under the action of the installation nut operating on threads 84 the bolt will be drawn into its home position incrementally exerting compressive forces first at point 72 and then incrementally along the contacting surface between the surface of the bolt and the surface of the tapered bore 14 until the bolt is seated.

As described in connection with FIG. 6, the compressive forces are generated first in the desired position between the bolt and the aluminum metal before contact is made between the bolt and the titanium metal, thereby ensuring a reduced installation force before the titanium metal is suitably expanded and compressed.

A review of FIGS. 6 and 7 will show that it is not always necessary or required that the largest diameter of the tapered bore be expanded first but, rather, that the metal having the smaller stress tolerance of the stacked array be expanded first and that in this manner the total installation force is reduced while bearing contact between the bolt and the tapered bore is incrementally made during the installation process.

Referring now to FIG. 8, there is shown a stacked array comprising sheets 10 and 12 and containing a sleevebolt 90. The sleevebolt by definition has an internal tapered bore 92 and contains a sleevebolt 96 having a head 98 at one end and installation threads 100 at the other end. The taper on bolt 96 is greater than the tapered bore 92 located on sleevebolt 90 and for the same reasons as described in connection with FIG. 6.

In FIG. 8 we can assume that the mechanic would know that sheet 10 is aluminum and that sheet 12 is titanium and hence would use a tapered bolt having a taper greater than the tapered bore 92.

Referring now to FIG. 9, there is shown a sleeve 90 inserted in the stacked array, only in this case the aluminum sheet 10 is on the bottom and the titanium sheet 12 is on top. The sleeve 90 contains a taper on the inside 92 and is shown accepting a tapered bolt 104 having a head 106 at one end and installation threads 108 at the other end.

In this case the mechanic knows that the titanium sheet 12 is on top and will utilize the bolt 104 having a taper that is less than the taper 92 on the sleeve 90 in order to ensure that contact takes place first against the sleeve and in the area of the aluminum metal designated at sheet 10.

The apparatus or method described in selecting a tapered bolt having a taper different than the tapered bore is applicable both to tapered bores in the stacked array directly and tapered bores in sleeves that are inserted in the stacked array.

The apparatus or method described in connection with the present invention gives the mechanic an opportunity to utilize the proper taper on the proper bolt to reduce the installation forces needed and to ensure that the more critical material is expanded first as a means of reducing the total installation force and to ensure that the critical interference and bearing is obtained.

It will be apparent to those skilled in the art that it is the relationship between the taper on the bolt and the taper in the bore that is controlling in reducing the installation force. It is possible therefore to change the taper in the bore relative to the taper on the bolt and achieve the same results. However, in the preferred embodiment it is expected that the tapered bore will be the same in all cases and that the mechanic will be utilizing different tapered bolts to achieve the desired results.

I claim:

1. A method of reducing installation forces in a stacked array of layers of different materials having a tapered bore which comprises the steps of:
    selecting a tapered fastener having a degree of taper that is different from the degree of taper of the bore in the stacked array, and
    then inserting the tapered fastener into the tapered bore until point contact between the tapered fastener and the tapered bore of the more deformable layer results in incremental deformation of said bore and a lower installation force.

2. A method according to claim 1 in which the selected tapered fasteners results in point contact taking place at the largest diameter of the tapered bore thereby providing correct hole bearing with respect to materials being used.

3. A method according to claim 1 in which the selected tapered fastener results in point contact taking place at the smallest diameter of the tapered bore.

4. A method according to claim 1 which includes the steps of:
    determining the relative strength of the metal in the stacked array, and
    then selecting a tapered fastener having a degree of taper that is less than the degree of taper of the bore in the event the largest diameter in the stacked array has a lower pounds per square inch stress than the other layers of stacked materials.

5. A method according to claim 1 which includes the method of determining whether the surface material having the largest diameter in the stacked array has a stress concentration that is less than the other materials comprising the stacked array, and
    then selecting a tapered fastener having a degree of taper that is less than the degree of taper of the tapered bore thereby achieving a reduced installation force.

6. A method of reducing installation forces in the prestressed fastening of layers of material having different modulus of elasticity which comprises the steps of:
    providing a tapered bore having a given taper through layers of materials to be fastened;
    selecting a tapered bolt with a degree of taper depending on whether the material having the smaller modulus of elasticity is located above or below the material having the greater modulus of elasticity; and
    then inserting the selected bolt into said bore until permanent deformation of the tapered bore surface has taken place.

7. A method of reducing installation forces according to claim 6 in which the step of selecting a tapered bolt further comprises:

selecting a tapered bolt having a degree of taper that is greater then the taper on the bore for those situations where the material having the smaller modulus of elasticity is located above the material having the greater modulus of elasticity.

8. A method of reducing installation forces according to claim 6 in which the step of selecting a tapered bolt further comprises:

selecting a tapered bolt having a degree of taper that is less then the taper on the bore for those situations where the material having the smaller modulus of elasticity is located below the material having the greater modulus of elasticity.

9. A method of reducing installation forces in the prestressed fastening of layers of titanium over aluminum which comprises the steps of:

providing a tapered bore having a given degree of taper through the layers of titanium and aluminum;

selecting a tapered bolt having a given degree of taper that is greater than the degree of taper on the bore; and then inserting the selected bolt into said bore until permanent deformation of the tapered bore surface has taken place.

10. A method of reducing installation forces in the prestressed fastening of layers of aluminum over titanium which comprises the steps of:

providing a tapered bore having a given degree of taper through the layers of aluminum and titanium;

selecting a tapered bolt having a given degree of taper that is less than the degree of taper on the bore; and then inserting the selected bolt into said bore until permanent deformation of the tapered bore surface has taken place.

* * * * *